Sept. 5, 1939.   C. STOCKSTROM   2,171,813
DRIP SHEET
Filed May 14, 1937
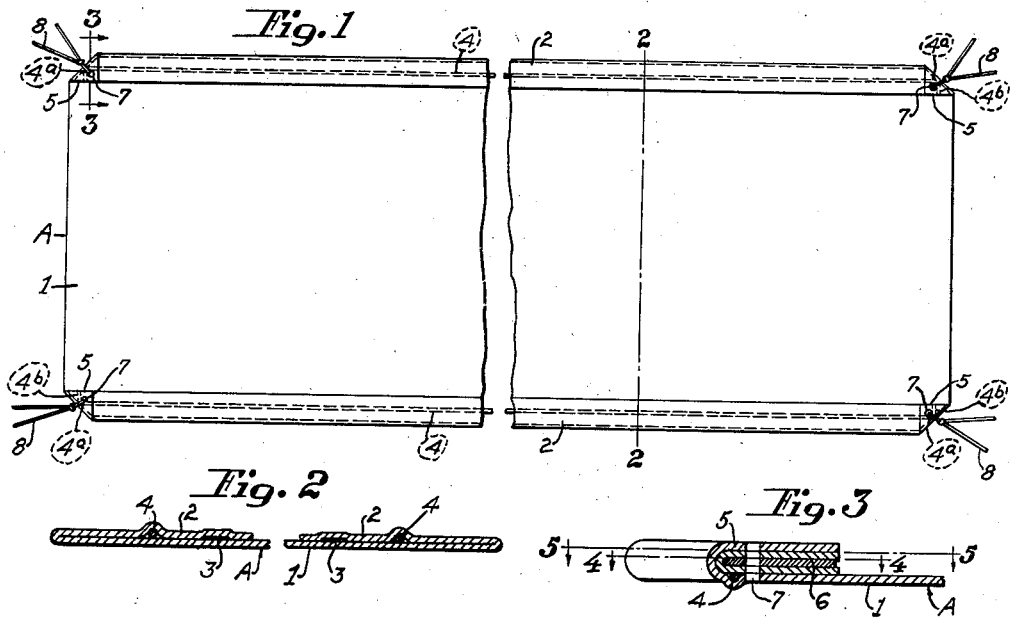
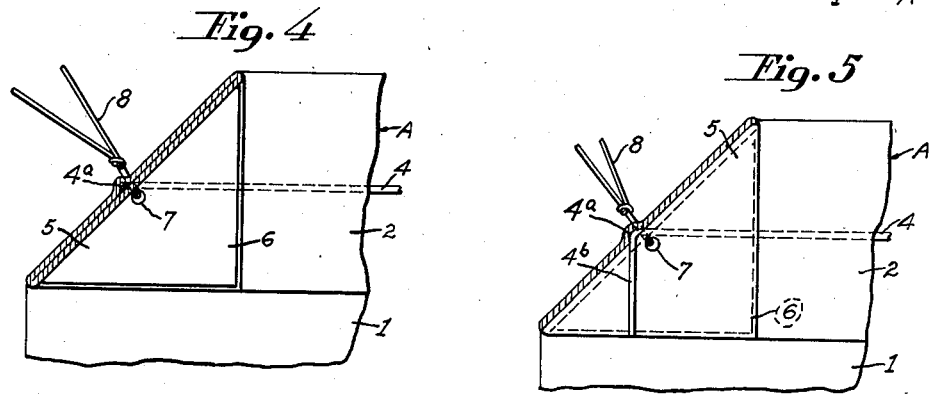
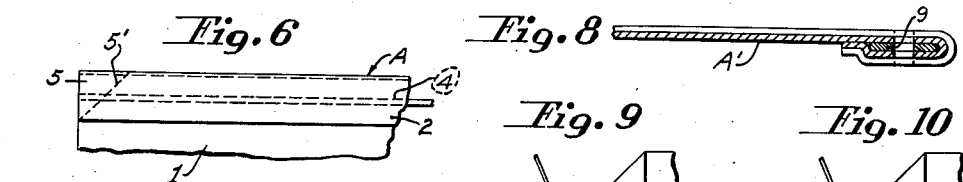
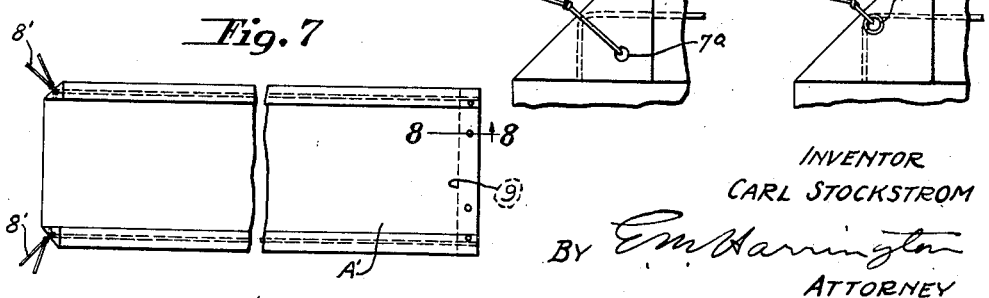
INVENTOR
CARL STOCKSTROM
BY E. M. Harrington
ATTORNEY Patented Sept. 5, 1939

2,171,813

UNITED STATES PATENT OFFICE 2,171,813

DRIP SHEET

Carl Stockstrom, St. Louis, Mo.

Application May 14, 1937, Serial No. 142,547

6 Claims. (Cl. 229—1.5)

This invention relates generally to drip sheets of the type adapted to be secured beneath the chassis frames of motor vehicles for the purpose of catching drippings of oil and gasoline from the under portions of the motor vehicles during transportation thereof from factories to dealers on transport trucks whereon some of the motor vehicles are elevated above others, the predominant object of the invention being to provide a drip sheet of this type which is so made that it is reinforced to enable it to withstand the destructive effects of wind and rapid passage of the drip sheets through the air as the transport trucks speed along highways.

Another object of the invention is to provide a drip sheet of the type to which this invention relates that is provided with barrier means along the side edges of the drip sheet that prevents leakage of the oil and gasoline, caught by the drip sheets, over the side edges of the drip sheets.

Still another object of the invention is to provide a drip sheet having improved means for connecting to the drip sheet attaching elements which serve to secure the drip sheet to a motor vehicle.

As is quite generally known to persons familiar with such matters many new motor vehicles are transported from plants where the motor vehicles are assembled to dealers who sell the motor vehicles, on transport trucks, on each of which a group of motor vehicles is arranged with certain of the motor vehicles in elevated positions with respect to other motor vehicles of the group. In order to protect the lower motor vehicles of a group of motor vehicles on a transport truck from damage caused by leakage of oil and gasoline from the elevated motor vehicles, it has been the practice to secure drip sheets formed of paper beneath the chassis frames of the motor vehicles so that any leakage of oil and gasoline from the motor vehicles will be caught by said drip sheets, and because it is not known at the assembly plants what motor vehicles will be in elevated positions on the transport trucks, drip sheets are usualy associated with all of the motor vehicles leaving the assembly plants.

The drip sheets heretofore used for this purpose comprised each a single ply sheet of paper which was provided with means at its opposite ends for securing the drip sheet to the motor vehicle, and because such a drip sheet was of the approximate length and width of the motor vehicle to which it was attached the drip sheet was subjected to considerable flapping about due to wind and rapid passage through the air as the transport truck traveled rapidly along the highway. Such flapping about of the drip sheets frequently caused drip sheets of the type employed prior to this invention to be torn at its opposite long side edges which permitted oil and gasoline that had been previously caught by the drip sheets to drip therefrom onto a motor vehicle located beneath the torn drip sheet. Also in the use of these previously known drip sheets, oil and gasoline frequently dripped over the opposite side edges of the sheets onto lower motor vehicles even though the drip sheets were not torn due to the fact that such drip sheets did not include any means for preventing such side dripping of oil and gasoline caught by the drip sheets.

The main object of the present invention, therefore, is to provide a drip sheet of the type to which this invention relates, with means extended along the opposed side edges thereof which reinforces the drip sheet at said side edges and also serves as a raised barrier that prevents leakage of oil and gasoline over the side edges of the drip sheet. Also an extremely important object of the invention is to provide a drip sheet which includes an improved arrangement for attaching to the drip sheet flexible fastening elements which serve to secure the drip sheet to a motor vehicle. These fastening elements in most cases are pieces of cord or lengths of thin wire and frequently, heretofore, the fastening elements cut through the portion of the drip sheets to which they were attached with the result that the drip sheets were released from the motor vehicle with which they were associated. By providing the improved drip sheet with fastening elements which are attached to the drip sheet in the improved manner disclosed herein the likelihood that the fastening elements will be pulled loose from the drip sheet is reduced to a minimum.

Fig. 1 is a plan view of the improved drip sheet, a portion thereof being broken away to permit the sheet to be drawn on a larger scale.

Fig. 2 is a section taken on line 2—2 of Fig. 1.

Fig. 3 is an enlarged section taken on line 3—3 of Fig. 1.

Fig. 4 is a section taken on line 4—4 of Fig. 3.

Fig. 5 is a section taken on line 5—5 of Fig. 3.

Fig. 6 is a fragmentary plan view illustrating a corner portion of the drip sheet before it has been completely formed.

Fig. 7 illustrates another form of the invention.

Fig. 8 is a section taken on line 8—8 of Fig. 7.

Figs. 9 and 10 illustrate modified forms of the invention.

In the drawing, wherein are shown for the purpose of illustration, merely, several embodiments of the invention A designates generally the improved drip sheet shown in Figs. 1 to 6 inclusive. The drip sheet A is formed from a sheet 1 of paper or other suitable material, which is of the approximate length and width of the chassis of the motor vehicle with which it is to be used and is of sufficient weight to perform its intended function. The sheet of material 1 is folded inwardly along its opposite long side edges to provide folds 2 which extend from end to end of the sheet 1, these folds being maintained in their folded condition by applying to either the body portion of the sheet 1 or the folded over strip portion which provides each fold, a line of glue as indicated at 3 in Fig. 2.

Within each fold 2 a length 4 of string, cord, or other suitable material may be interposed between the body portion of the sheet 1 and the folded over strip portions of the fold, said lengths of string, cord, or other suitable material being extended from end to end of the sheet 1. In forming the folds 2, the line of glue 3 is applied to the sheet of material 1 and the lengths of string, cord, or other suitable material, are drawn through a body of glue contained in a suitable receptacle so that said lengths of string, cord or other material receives an application of glue thereto. The strip portions are then folded over to produce the folds and because of the presence of the lines of glue and the glue on the lengths of string, cord, or other material, the portions of the folds are securely attached together and the lengths of string, cord, or other material are fixedly anchored in place within the folds.

Obviously, the folds 2, of themselves, reinforce the opposed side edges of the sheet 1 so as to resist the tendency of said side edges to be torn by wind or rapid passage of the sheet through the air. However by employing the lengths of string, cord, or other suitable material, within the folds 2 the reinforcing value of the folds is very greatly increased as the lengths of string, cord, or other suitable material will arrest any tearing action at the opposed side edges of the sheet.

At each of the four corners of the sheet 1 a triangular portion 5 of the fold 2 is folded over as shown in Fig. 1. In Fig. 6 a corner portion of the sheet 1 is illustrated as it appears before the fold 5 is made, and in this view an imaginary diagonal line 5' indicates the line on which the fold 2 is folded to produce the triangular fold 5. When the folded side marginal portions of the sheet 1 are folded to produce the triangular corner folds 5 the lengths 4 of string, cord, or other suitable material, follow the course shown by dotted lines in Fig. 1 and by dotted and full lines in Fig. 5; that is to say a sharp bend 4a is formed in each end portion of each length of string, cord, or other suitable material, and the portion 4b of the length of material 4 extends inwardly toward the center of the sheet 1 at an approximate right angle with respect to the main body of said length of material 4. The folded over portions of the triangular folds 5 are suitably glued in their folded condition, and if desired, pieces 6 of chipboard or other suitable material, may be interposed between the folded over portions of the folds 5 and the lower portions of the folds 2. The pieces 6 of material may be secured in place within the folds 5 by glue which secures said piece of material to adjacent portions of the folds and they serve to reinforce the folds 5 as will hereinafter appear.

Formed through the various thicknesses of material which form each of the folds 5 and through the associated piece of material 6 is a hole 7. The holes 7 at the four corners of the drip sheet A shown in Fig. 1 receive flexible attaching elements 8 which serve to attach the drip sheet to a motor vehicle with which it is associated, these attaching elements being in the form of cords or thin flexible wire. The attaching elements are tied to or twisted about convenient parts of the chassis of the motor vehicle so as to secure the drip sheet in its proper position beneath the chassis frame of the motor vehicle.

In the use of the improved drip sheet disclosed herein, said drip sheet is attached in place beneath the chassis frame of the motor vehicle with the folds 4 at the long side edges of the drip sheet located at the top face of the drip sheet as shown in Fig. 2. With the drip sheet so disposed the folds 4 serve as raised barriers which prevent oil and gasoline caught by the drip sheet from dripping over the opposed side edges of the drip sheet. Additionally the folds 2 together with the lengths 4 of material located therein serve, as has been already explained herein, to reinforce the side edge portions of the drip sheet so as to prevent tearing of said side edge portions of said drip sheet. The glue employed to secure various folded portions of the drip sheet together is of such nature that it is not affected by oil and gasoline.

Regarding the improved manner of securing the attaching elements 8 to the drip sheet, it is to be noted that the holes 7 are located within the angles of the rectangular end portions of the lengths of material 4, and therefore, if the strains caused by the maintenance of the drip sheet in place in association with a motor vehicle cause the attaching elements to cut through the thicknesses of the folds and through the pieces of reinforcing material, when such pieces of reinforcing material are used, said attaching elements wil be brought into engagement with the lengths of material 4 and thereafter said strains will be transmitted from the attaching elements 8 to the lengths of material 4. Thus the attaching elements are prevented from being pulled entirely free from the drip sheets by the strains mentioned. The holes 7 may be preformed or may be formed by a suitable instrument when the fastening elements are being threaded through the drip sheet. Also as shown in Fig. 10 the holes 7 may be provided with suitable grommets 7' through which the attaching elements will be passed.

In Figs. 7 and 8 a drip sheet A' is shown which is provided at one end with a strip 9 of chipboard or other suitable material which is glued to the sheet from which the drip sheet is formed and extends transversely of the drip sheet, said strip 9 being preferably arranged within a fold formed in the sheet of material as shown in Fig. 8. The strip 9 and the sheet from which the drip sheet A' is formed are provided with openings formed therethrough which receive projected portions of the chassis of the motor vehicle for the purpose of fastening the drip sheet at one end to the motor vehicle chassis. At its opposite end the drip sheet A' is provided with fastening elements 8' of the type shown in Fig. 1.

If desired the hole 7a in each corner of the drip sheet may be considably removed from the diagonal edge of the fold 5 as shown in Fig. 9, so as to put a greater amount of material between the hole and said diagonal edge of the fold. Thus, it would be necessary for the attaching elements to cut through a considerable amount of material before it would approach the diagonal edge of the fold 5.

I claim:

1. A drip sheet comprising a rectanguar sheet of material, reinforcing means including folded portions of said sheet of material located at edges of said sheet of material, elongated lengths of flexible material located within said folded portions and extended longitudinally thereof, folds formed in said folded portions at corners of the drip sheet, said folds being so made that angles are formed in said elongated lengths of material, and attaching elements connected to said sheet of material at points within the angles formed in said elongated lengths of material.

2. A drip sheet comprising a rectangular sheet of material, reinforcing means including folded portions of said sheet of material located at edges of said sheet of material elongated lengths of flexible material located within said folded portions and extended longitudinally from end to end thereof, folds formed in said folded portions at corners of the drip sheet, said folds being so made that angles are formed in said elongated lengths of material, and attaching elements, said attaching elements being extended through holes formed through thickness of said folds at points within the angles formed in said elongated lengths of material.

3. A drip sheet comprising a rectangular sheet of material, reinforcing means including folded portions of said sheet of material located at edges of said sheet of material, elongated lengths of flexible material located within said folded portions and extended longitudinally from end to end thereof, folds formed in said folded portions at corners of the drip sheet, said folds being so made that angles are formed in said elongated lengths of material, reinforcing members located within said folds, and attaching elements, said attaching elements being extended through holes formed through thicknesses of said folds and through said reinforcing members at points within the angles formed in said elongated lengths of material.

4. A drip sheet comprising a rectangular sheet of material, reinforcing means including folded portions of said sheet of material located at edges of said sheet of material, elongated lengths of flexible material located within said folded portions and extended longitudinally from end to end thereof, folds formed in said folded portions at corners of the drip sheet, said folds being so made that angles are formed in said elongated lengths of material, reinforcing members located within said folds, attaching elements, said attaching elements being extended through holes formed through thicknesses of said folds and through said reinforcing members at points within the angles formed in said elongated lengths of material, and a strip of material extended transversely of said sheet of material at an end thereof, said sheet of material and said transverse strip being provided with holes adapted to receive parts of a structure to which the drip sheet is attached.

5. A drip sheet comprising a rectangular sheet of material, reinforcing means including folded portions of said sheet of material located at edges of said sheet of material, elongated lengths of flexible material located within said folded portions and extended longitudinally from end to end thereof, folds formed in said folded portions at corners of the drip sheet, said folds being so made that angles are formed in said elongated lengths of material, attaching elements, said attaching elements being extended through holes formed through thicknesses of said folds at points with the angles formed in said elongated lengths of material, and grommets arranged in said holes through which said attaching elements extend.

6. A drip sheet comprising a rectangular sheet of material, reinforcing means including folded portions of said sheet of material located at edges of said sheet of material, elongated lengths of flexible material located within said folded portions and extended longitudinally from end to end thereof, folds formed in said folded portions at corners of the drip sheet, said folds being so made that angles are formed in said elongated lengths of material, reinforcing members located within said folds, attaching elements, said attaching elements being extended through holes formed through thicknesses of said folds and through said reinforcing members at points within the angles formed in said elongated lengths of material, and grommets arranged in said holes through which said attaching elements extend.

CARL STOCKSTROM.